(12) United States Patent
Newton

(10) Patent No.: US 6,170,253 B1
(45) Date of Patent: Jan. 9, 2001

(54) CASCADE STRUCTURE ARRANGEMENT FOR A GAS TURBINE ENGINE

(75) Inventor: Arnold C Newton, Derby (GB)

(73) Assignee: Rolls-Royce plc, London (GB)

( * ) Notice: Under 35 U.S.C. 154(b), the term of this patent shall be extended for 0 days.

(21) Appl. No.: 09/174,448

(22) Filed: Oct. 19, 1998

(30) Foreign Application Priority Data

Nov. 1, 1997 (GB) .............................................. 9723033.1

(51) Int. Cl.[7] ..................................................... F02K 3/02
(52) U.S. Cl. ....................... 60/226.2; 60/228; 239/265.31
(58) Field of Search ................................. 60/226.2, 228, 60/230, 232; 239/265.31, 267.37

(56) References Cited

U.S. PATENT DOCUMENTS

| 2,879,959 | | 3/1959 | Morrison | 244/129 |
|---|---|---|---|---|
| 3,511,055 | * | 5/1970 | Timms | 60/229 |
| 4,044,973 | * | 8/1977 | Moorehead | 244/54 |
| 4,132,069 | | 1/1979 | Adamson | 60/226 R |
| 4,278,220 | * | 7/1981 | Johnston et al. | 244/110 B |
| 4,629,146 | * | 12/1986 | Lymons | 244/53 R |
| 4,683,717 | | 8/1987 | Naud | 60/226.1 |
| 4,825,648 | | 5/1989 | Adamson | 60/226.1 |
| 4,920,744 | | 5/1990 | Garcia et al. | 60/226.1 |
| 5,157,915 | * | 10/1992 | Bart | 60/39.31 |
| 5,228,641 | * | 7/1993 | Remlaoui | 244/110 B |

FOREIGN PATENT DOCUMENTS

| 1 304 212 | 1/1973 | (GB) . |
|---|---|---|
| 1304212 | 1/1973 | (GB) . |
| 2 045 179 | 10/1980 | (GB) . |
| 2045179 | 10/1980 | (GB) . |
| 2266080 | 10/1993 | (GB) . |

* cited by examiner

Primary Examiner—Timothy S. Thorpe
Assistant Examiner—Robert Z. Evora
(74) Attorney, Agent, or Firm—W. Warren Taltavull; Farkas & Manelli PLL

(57) ABSTRACT

A gas turbine engine is provided with a translatable cowl and a cascade structure which is nested within the translatable portion of the cowl. The cascade structure comprises a pair of C ducts which are exposed upon translation of a portion of the cowl. The C ducts are capable of rotation about an axis parallel to the longitudinal axis of the engine thus allowing access to the core of the engine.

5 Claims, 2 Drawing Sheets

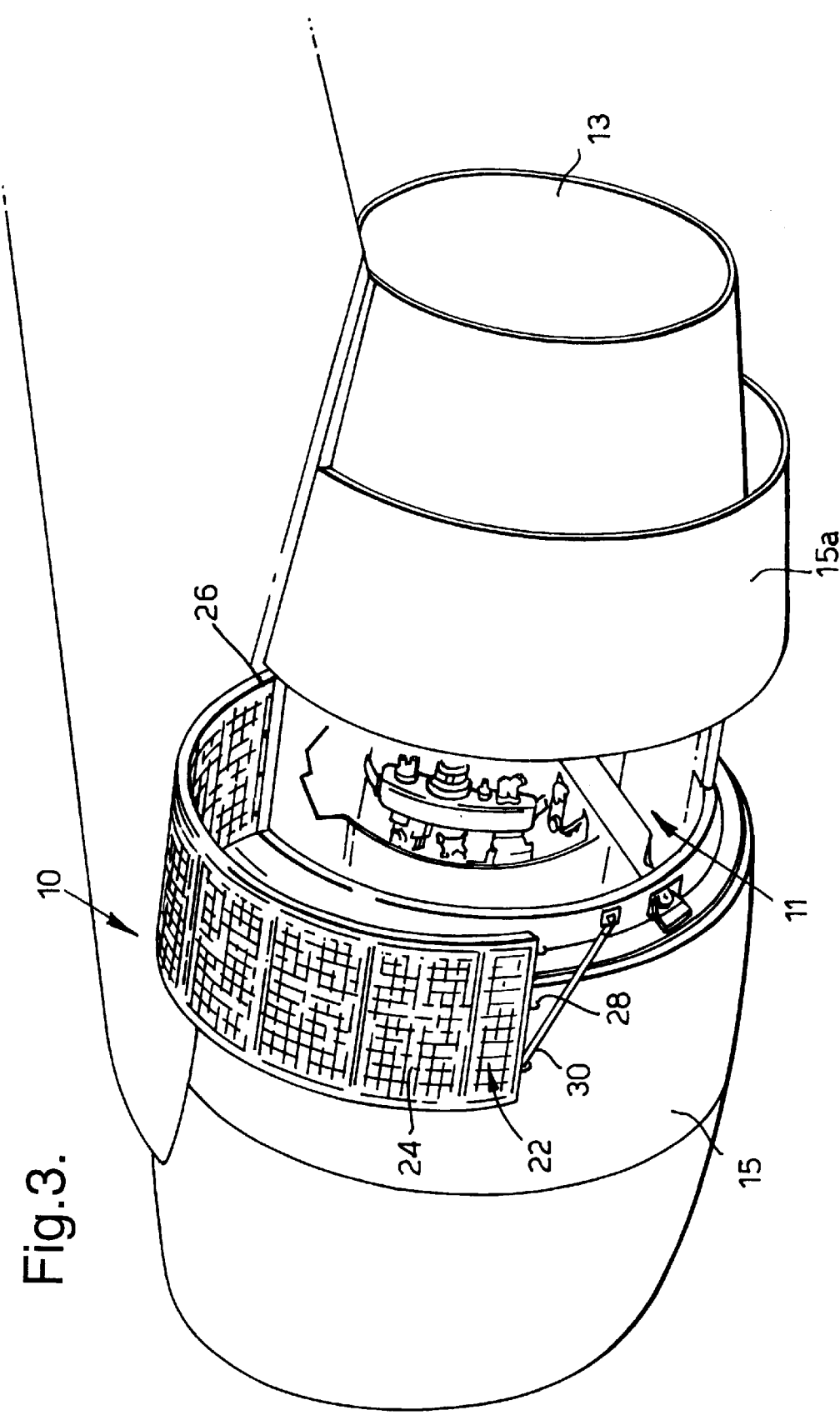

CASCADE STRUCTURE ARRANGEMENT FOR A GAS TURBINE ENGINE

FIELD OF THE INVENTION

This invention relates to a ducted fan gas turbine engine. More particularly but not exclusively this invention relates to a gas turbine engine comprising a thrust reverser.

BACKGROUND OF THE INVENTION

Ducted gas turbine engines are designed to enable a stream of cold air from the fan to pass through a channel formed by a duct between the casing of the engine and outer ducting or cowling. It is known to provide ducted fan gas turbines with means for deflecting this by-pass flow of air so as to assist in braking of an aircraft on which the engine is mounted. Such thrust reversing means are designed in various forms. One prior art proposal is to provide a plurality of doors which are translatable into positions which block the by-pass air. A plurality of deflector vanes are provided within cowling which is uncovered when the thrust reverser is in the deployed position. Thus the fan exhaust air is directed generally radially outward and partially forward by the deflector vanes to provide braking.

It is important to provide access to gas turbine engines so that maintenance and inspection of parts can be conducted. One method of allowing access is to provide doors within the engine casing. These doors are generally C shaped and hinged at a location adjacent the pylon from which the engine is mounted on the aeroplane. One main problem with such doors is that because they form part of the actual casing of the engine, the coupling is inherently heavy and complicated. Also, because of the weight of the doors, hydraulic jacks are normally employed to control movement of the doors. Such C ducts must also be designed to accommodate the space requirements of thrust reversers. Such an arrangement is disclosed in prior patent GB1,304,212 and GB2,045,179 among others.

Another method of providing access to ducted, large by-pass gas turbines has been by actual entry into the ducting by the maintenance crew. However on some engines the by-pass areas have been reduced and the area is not large enough to allow access.

SUMMARY OF THE INVENTION

It is an object therefore of the present invention to provide improved access to a gas turbine engine for maintenance or inspection and/or provide improvements generally.

According to the invention there is provided a gas turbine engine comprising a cowl, an annular portion of which is translatable relative to the remainder thereof, a cascade structure being nested within the translatable portion of the cowl in a non-operative position and being exposed, in an operative position upon translation of said annular portion wherein said cascade structure comprises at least one C shaped section capable of rotation to an open position about an axis substantially parallel to a longitudinal axis of the gas turbine engine, thereby allowing access to the core engine.

Preferably the C section is hingeably connected to the non-translatable portion of the cowl.

In one embodiment of the invention the translatable portion and said cascade portion form a gas turbine engine thrust reverser.

BRIEF DESCRIPTION OF THE DRAWINGS

The invention will now be described by way of example with reference to the accompanying drawings in which:

FIG. 3 is pictorial representation of a gas turbine engine in accordance with the present invention.

DETAILED DESCRIPTION OF THE INVENTION

Figure 1:
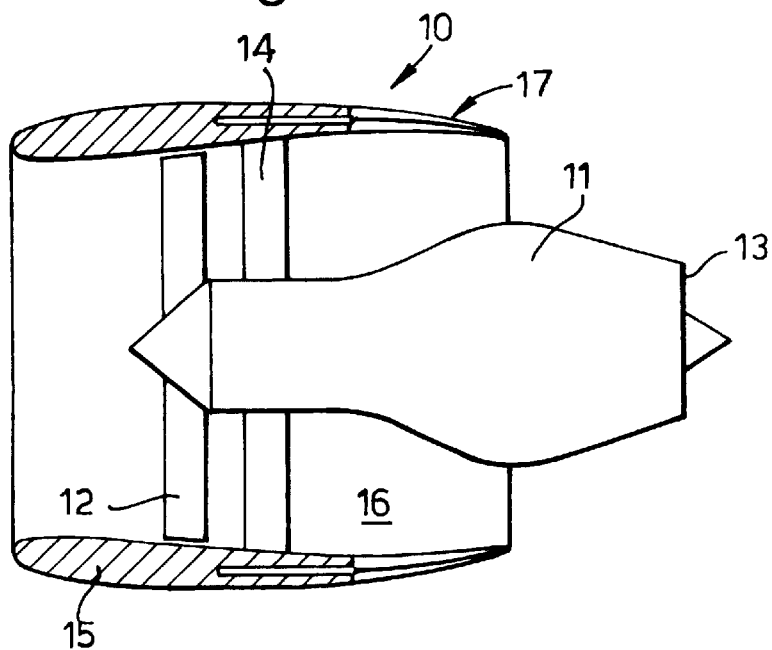
FIG. 1 is a diagrammatic sectional side view of a ducted gas turbine engine having a thrust reverser

With reference to FIG. 1 a ducted fan gas turbine engine generally indicated at 10 is of generally conventional configuration. It comprises a core gas generator 11 which drives a propulsive fan 12. The hot exhaust from the gas generator core 11 is expelled through a nozzle 13 provided at the downstream end thereof to provide additional propulsive thrust. Immediately downstream of the fan 12 there is provided an annular array of radially extending outlet guide vanes 14. The outlet guide vanes perform a dual role. Firstly they act upon the airflow exhausted from the fan 12 in order to de-swirl and re-direct it in a generally axial direction. Secondly they support an annular axially extending cowling 15 which surrounds the fan 12 and the upstream part of the core 11.

Figure 2:
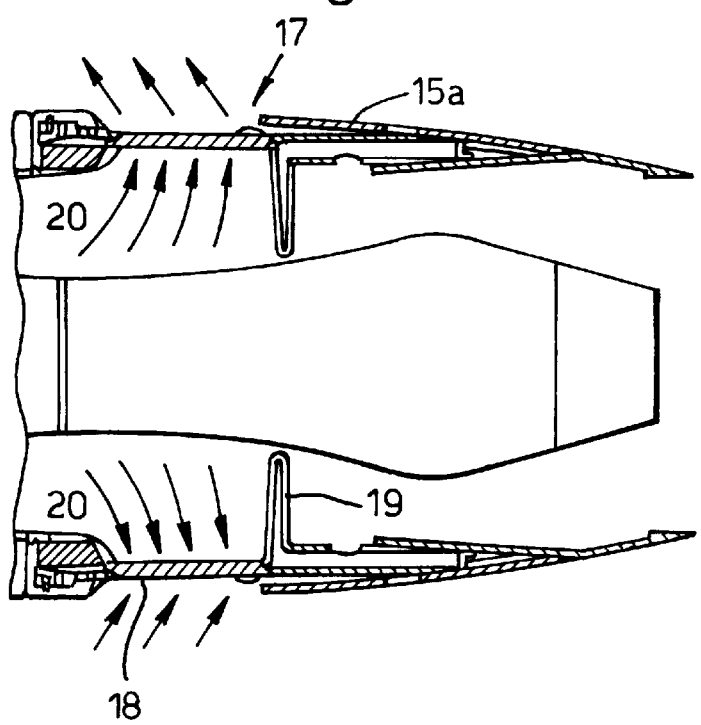
FIG. 2 is a diagrammatic sectional side view of a gas turbine engine with the thrust reverser in its operative position.

The core 11 and the cowling 15 cooperate to define an annular fan duct 16 through which air accelerated by the fan 12 is exhausted to atmosphere to provide the majority of the propulsive thrust of the gas turbine engine 10. Under normal flight conditions the gas turbine engine 10 is configured in the manner shown in FIG. 1. The configuration of the thrust reverser 17 when deployed is shown in FIG. 2. During normal flight the thrust reverser 17 is in the position indicated in FIG. 1. However when the aircraft carrying the engine lands and requires retardation, the thrust reverser 17 is deployed to the position shown in FIG. 2. This is achieved by rearward translation of the downstream end of cowling or nacelle 15a to reveal an array of forward facing deflector vanes 18 in the wall of the nacelle. Simultaneously a plurality of doors 19 which previously defined part of the radially inner surface of the nacelle pivot into positions in which they block passage 20.

The thrust reverser also comprises two cascade doors 22 which comprise an array of substantially rectangular sections 24. (It is to be noted that any suitable shape of section may be employed.) Each section 24 comprises a plurality of vanes which direct air blocked by the thrust reverser doors 19 through the cascade in a desired direction towards the rear of the engine. Each cascade door is hinged to the engine casing at 26 and is held in a closed position (not shown) by a series of structural fasteners e.g. latches 28 which connect the underside of the engine casing. These latches hold the C sections in place when in a closed position and also provide additional strengthening to the thrust reverser assembly. Hence the latches not only provide a fastening mechanism but also add to the overall structural integrity of the thrust reverser assembly. Neither of these connections interfere with the translating capability of the cowling 15a which forms part of the thrust reverser.

When access to the core of the engine is required the thrust reverser cowling 15a is translated to its operative position as shown in FIG. 3 and the cascade doors are opened radially outwards. The doors are held in position by a rod 30 which is stowed away when not required. Advantageously the cascade doors eliminates the need for C doors to be provided in the outer casing of the engine which are inherently heavy and difficult to operate employing complex control systems and hinge arrangements.

What is claimed is:

1. A gas turbine engine comprising a core engine, a cowl surrounding said core engine, and a cascade structure, said cowl comprising an annular portion which is independently and axially translatable relative to the remainder of the cowl, and the cascade structure between a non-operative position and an operative position; in the non-operative position the cascade structure being nested within said annular portion and in an operative position, upon translation of said annular portion, the cascade structure being exposed, the cascade structure comprising at least one C shaped section which is rotatable about an axis substantially parallel to a longitudinal axis of the gas turbine engine to an open position allowing access to the core engine.

2. A gas turbine engine according to claim 1 wherein the C shaped section is hingeably connected to the non-translatable portion of the cowl.

3. A gas turbine engine according to claim 2 wherein the translatable portion and said cascade portion for a gas turbine engine thrust reverser.

4. A gas turbine engine according to claim 1 wherein the translatable portion and said cascade portion form a gas turbine engine thrust reverser.

5. A gas turbine engine according claim 1 wherein a latch means hold each C shaped section in a closed position.

* * * * *